United States Patent
Chakraborty et al.

(10) Patent No.: US 7,370,061 B2
(45) Date of Patent: May 6, 2008

(54) METHOD FOR QUERYING XML DOCUMENTS USING A WEIGHTED NAVIGATIONAL INDEX

(75) Inventors: Amit Chakraborty, Cranbury, NJ (US); Liang H. Hsu, West Windsor, NJ (US); Zhijing Liu, Audubon, PA (US); Peiya Liu, East Brunswick, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 351 days.

(21) Appl. No.: 11/204,061

(22) Filed: Aug. 15, 2005

(65) Prior Publication Data

US 2006/0167928 A1    Jul. 27, 2006

Related U.S. Application Data

(60) Provisional application No. 60/647,714, filed on Jan. 27, 2005, provisional application No. 60/647,717, filed on Jan. 27, 2005.

(51) Int. Cl.
*G06F 17/00*        (2006.01)
(52) U.S. Cl. .................. 707/102; 707/101; 707/103 R

(58) Field of Classification Search .................. None
See application file for complete search history.

(56) References Cited

U.S. PATENT DOCUMENTS

| | | | |
|---|---|---|---|
| 2004/0010752 A1* | 1/2004 | Chan et al. .................. 715/513 |
| 2005/0050016 A1* | 3/2005 | Stanoi et al. .................. 707/3 |
| 2006/0167928 A1* | 7/2006 | Chakraborty et al. ....... 707/102 |

* cited by examiner

*Primary Examiner*—Sana Al-Hashemi

(57) ABSTRACT

A technique for optimizing the archival and management of data stored as XML documents is capable of handling mixed data including highly structured data and unstructured data. The technique maps the structured data to a relational database while storing the unstructured data in its native XML format. The data is updated using a rules database that maps updating rules against attributes and classes of elements within the documents. A document checking/validation engine performs the updates based on rule verification. A search engine searches the documents using both a path index table and a weighted content index.

8 Claims, 16 Drawing Sheets

FIG. 4

```xml
410─<?xml version="1.0"?>                              400
   <indexer>
      <indexerFrontEnd>
         <context>
            <group level="1">Company</group>
            <group level="2">Division</group>
            <group level="3">Department</group>
         </context>
      </indexerFrontEnd>
      <indexerBackEnd>
      <header>
         <definevar name="$file$" type="path">//docheader/@file</definevar>
      </header>
      <record>
         <contextNode type="path">//tbody/row[boolean(.//anchor)=false]</contextNode>
         <field name="currentNode" type="content">node content</field>
         <field name="file" type="string">$file$</field>
         <field name="keyword" type="textual">/*</field>
         <field name="orderNo"
              type="path">//entry[1]/para[boolean(anchor)=false]/text()</field>
440─     <field name="identStr" type="path">//entry[2]/para[1]/link/text()</field>
450─     <field name="designation" type="path">//entry[2]/para[2]/text()</field>
         <field name="Rek"
              type="path">//entry[5]/para[boolean(anchor)=false]/text()</field>
         <field name="materialNo"
              type="path">//entry[6]/para[1][boolean(anchor)=false]/text()</field>
         <field name="Tin" type="path">//entry[6]/para[3]/text()</field>
      </record>
      </indexerBackEnd>
   </indexer>
```

FIG. 6

```
                                                              600
605~<Search>
        <complete type="xml">
            <xmlfile>searchOutput_Node.xml</xmlfile>
            <stylesheet.styles/pgiebtop_f.xsl</stylesheet>
        </complete>
        <individual type="xml">
            <xmlfile>searchOutput_File.xml</xmlfile>
            <stylesheet>styles/pgiebtop_i.xsl</stylesheet>
        </individual>
        <xquery_type="xml">
        <xmlfile></xmlfile>
        <stylesheet></stylesheet>
        </xquery>
        <detailcontext>
        <indicator>surveyAssembly</indicator>
        <indicator>majorComponent</indicator>
        <item>compnent</item>
        </detailcontext>
        <filterkey>
          ⎧ <item path="/">keyword</item>
          ⎪ <item path="//entry[2]/para[1]/link/text()">identStr</item>
     610 ⎨ <item path="//entry[2]/para[2]/text()">designation</item>
          ⎪ <item path="//entry[5]/para[1]/text()">Rek</item>
          ⎪ <item path="//entry[5]/para[1]/text()">materialNo</item>
          ⎩ <item path="//entry[6]/para[3]/text()">Tin</item>
        </filterkey>
        <result>
     620⎰ <resultType>File</resultType>
         ⎱ <resultValueName>currentNode</resultValueName>
        </result>
    </Search>
```

FIG. 8

| EXPRESSION | MEANING |
|---|---|
|  |  |
| e.g. b*d? | LIGHTWEIGHT, REGULAR-EXPRESSION |
| term~ | FOR CLOSENESS MATCHING |
| [term1 TO term12] | MATCHES DOCUMENTS WITH TERMS BETWEEN BEGINNING AND ENDING TERMS EXCLUDING THE END POINTS |
| [term1 TO term12] | MATCHES DOCUMENTS WITH TERMS BETWEEN BEGINNING AND ENDING TERMS EXCLUDING THE END POINTS |
| "term1 term2..." | EXACT PHRASES |
| {term1 term2...} | SENTENCES |
| (expr...) | GROUPING |
| expr1 AND expr2 | ALL OF EXPRESSION |
| expr1 OR expr2 | AT LEAST ONE OF THE EXPRESSION |
| expr NOT expr2 | NOT THE EXPRESSION 2 |

FIG. 12

Search Results - 4 Document(s) Found 3.6.2 - 20310 - 0200.xml
3.6.2 - 20310 - 0105.xml
3.6.2 - 20310 - 0212.xml
3.6.2 - 20310 - 0216.xml

} 1210

1200

1220

| Ident String<br>KWU Article Code<br>Designation<br>Cust. SAP ID | Quantity Installed | Rek | TIN |
|---|---|---|---|
| ☐ 20310.0001.0006<br>A2A50033438<br>Spacer Ring Stage 6 | 1 | L | H12B66B98 |
| ☐ 20310.0001.0007<br>A2A50033436<br>Spacer Ring Stage 6 | 1 | L | H12B66B72 |
| ☐ 20310.0001.0008<br>A2A50033437<br>Spacer Ring Stage 6 | 1 | L | H12B66B80 |
| ☐ 20310.0001.0010<br>A2A50213784<br>Compressor Wheel 1 | 1 | U | . |
| ☐ 20310.0001.0010.0003<br>A2A50006152<br>Lock Washer | 29 | T | H12B51653 |
| ☐ 20310.0001.0010.0004<br>A2A50006337<br>Rotating Blade 1 | 29 | S | H12B45A69 |
| ☐ 20310.0001.0011<br>A2A50033231<br>Compressor Wheel 2 | 1 | U | . |
| ☐ 20310.0001.0011.0003<br>A2A50007404<br>Lock Washer | 33 | T | H13C82B35 |
| ☐ 20310.0001.0011.0004<br>A2A50006338<br>Rotating Blade 2 | 33 | S | H12B45A77 |

US 7,370,061 B2

METHOD FOR QUERYING XML DOCUMENTS USING A WEIGHTED NAVIGATIONAL INDEX

CLAIM OF PRIORITY

This application claims priority to, and incorporates by reference herein in its entirety, pending U.S. Provisional Patent Application Ser. No. 60/647,714, filed Jan. 27, 2005, and pending U.S. Provisional Patent Application Ser. No. 60/647,717, also filed Jan. 27, 2005.

FIELD OF THE INVENTION

The present invention relates generally to the fields of document management and database management. More specifically, the invention relates to search and retrieval mechanisms for a database comprising XML documents having varying structures and definitions.

BACKGROUND OF THE INVENTION

The rapid increase in Internet usage has ushered in a boom in e-business activities around the globe. Every day, numerous organizations create hundreds of thousands of web pages touting their services and products. Further, an e-marketplace has rapidly emerged, where transactions between different organizations and between the individual customer and a collection of business partners are taking place seamlessly.

Those developments are facilitated by the power of the Web, which in turn is made possible by the use of eXchange Markup Language (XML). XML is being used as the standard mode of document exchange. The popularization of that standard promotes the integration process and communication between organizations. Furthermore, the inherent structural richness that is the hallmark of the language has helped with the in-house document management process.

However, to be able to fully exploit the advantages from using XML, one must be able to profitably archive and search such documents, and to search in a manner that takes advantage of the structured nature of such documents. That is especially true in the case of e-business applications where different products might have to be searched based on their different characteristics or based on their hierarchical position as is frequently the case in spare parts.

Relational databases are highly efficient for the archiving and querying of data that can be tabularized; i.e., organized as rows and columns. XML, however, represents data with a hierarchical structure, and might or might not follow a document type definition (DTD) or a schema. The depth of the hierarchy can be irregular and unpredictable. That significant difference requires different approaches to store, index, and retrieve XML data. There is therefore a need for a search mechanism that can handle relational databases as well as well-formed XML document collections.

The effective archival of XML data also requires a good methodology for indexing that data. Any indexing scheme must be flexible and adaptive. For example, if there is a likelihood of a certain class of query being repeated more often than others, the indexing scheme should adjust to that.

Except for trivial situations, retrieval efficiency is directly related to how good the indexing of the data is. While there are several efficient indexing schemes for tabularized data, such methods cannot directly be mapped to use for XML document collections, because of the additional structural information contained in XML data.

Further, an indexing scheme is more than simply an index; rather, the scheme should be efficient for addressing the queries against the database. To make the indexing scheme efficient, it is preferable that the index itself change based on the type of query. Thus, if a type of query is repeated often, the index should respond to that.

There is therefore presently a need to provide methods and systems for querying large data archives containing XML files. Particularly, there is a need for a technique for storing, indexing and retrieving XML data, given the uneven hierarchy depths and other unique aspects of data stored in that manner. To the inventors' knowledge, no such techniques are currently available.

SUMMARY OF THE INVENTION

The present invention addresses the needs described above by providing an apparatus and method for accessing a collection of mark-up language documents. One embodiment of the invention is a method for accessing mark-up language documents having a DTD defining the documents of the collection. The method includes the step of mapping nodes of the DTD to create a path index table entry in a path index. For each document in the collection, a document object model (DOM) tree is created for the document (the DOM tree including terminal nodes), keywords are identified in the terminal nodes and, for each keyword in each terminal node, a weighted content index entry is created in a weighted content index, the entry including an a-priori probability of a query with that keyword for that terminal node. A query of the collection of documents is performed using the path index and the weighted content index to obtain query results, and the path index and the weighted content index are updated based on the query results.

The method may further include the step of computing the a-priori probability of a query with that keyword for that terminal node by calculating a frequency for the terminal node and keyword.

The weighted content index entry may be in the form F(DocID, NodeID, LevelID, ElementType, KeywdFreq, Probability), where DocID is a document identification, NodeID is a node identification, LevelID is a hierarchy level, ElementType is an element type, KeywdFreq is a frequency of the keyword in the terminal node and Probability is the a-priori probability of a query with that keyword for that terminal node.

The step of performing a query of the collection of documents using the path index and the weighted content index to obtain query results may further include the step of referring to the path index to determine the paths to search, and conducting a constrained search of the determined paths using the weighted content index.

Another embodiment of the invention is a data retrieval system for retrieving structured data from a collection of XML documents. The system includes an indexer module, an indexer agent of the indexer module comprising at least one servlet for gathering information from the collection of XML documents, and an indexer of the indexer module for analyzing gathered information from the XML documents and creating an index directory for the collection of XML documents. The index directory includes weighted content index entries, each entry including an a-priori probability of a query with a keyword in that entry.

The system also includes a configurable query module, a query agent of the query module including a graphical user interface (GUI) for specifying a query and displaying query results, and a query engine of the query module for performing a specified query.

In one embodiment of the data retrieval system, the indexer analyzes document structures and metadata contained in the XML documents. The indexer may further be for creating a document object model (DOM) tree for each XML document, the DOM tree including terminal nodes, and the indexer identifying the keywords for the terminal nodes.

The indexer may compute the a-priori probability of a query with a keyword in that entry by calculating a frequency of the keyword for a corresponding terminal node. The indexer agent may further include a GUI for interfacing with a user.

The query engine may be configured to query both content of the XML documents and structure of the XML documents. Filters may be specified in the GUI of the query agent.

The indexer may also include an analyzer based on at least one of a linguist, a thesaurus and an ontology for analyzing the gathered information from the XML documents. The indexer may include a document parser for extracting metadata from the documents.

The at least one servlet of the indexer agent may be a Java Server Page (JSP). The query engine may further be for updating the index directory based on the query results.

BRIEF DESCRIPTION OF THE DRAWINGS

FIG. 4 is an XML code fragment demonstrating an index template according to one embodiment of the invention.

FIG. 6 is an XML code fragment demonstrating a query template according to one embodiment of the invention.

FIG. 8 is a table showing an example query text expression syntax according to one embodiment of the invention.

FIG. 12 is an example screen shot showing search results including matched XML documents according to one embodiment of the invention.

DESCRIPTION OF THE INVENTION

The present application describes an effective and configurable XML search mechanism suited for traditional keywords search and as well as context sensitive searching for a large collection of XML documents. A weighted navigational indexer is also described. The search mechanism may be used as a stand-alone application or within a Web application. It may be used for a variety of applications such as e-business, digital libraries, and other content management problems. The indexer provides another tool for accessing large XML document collections using an efficient indexing scheme.

The invention is a modular framework and method and is deployed as software as an application program tangibly embodied on a program storage device. The application is accessed through a graphical user interface (GUI). The application code for execution can reside on a plurality of different types of computer readable media known to those skilled in the art. Users access the framework by accessing the GUI via a computer.

Figure 17:
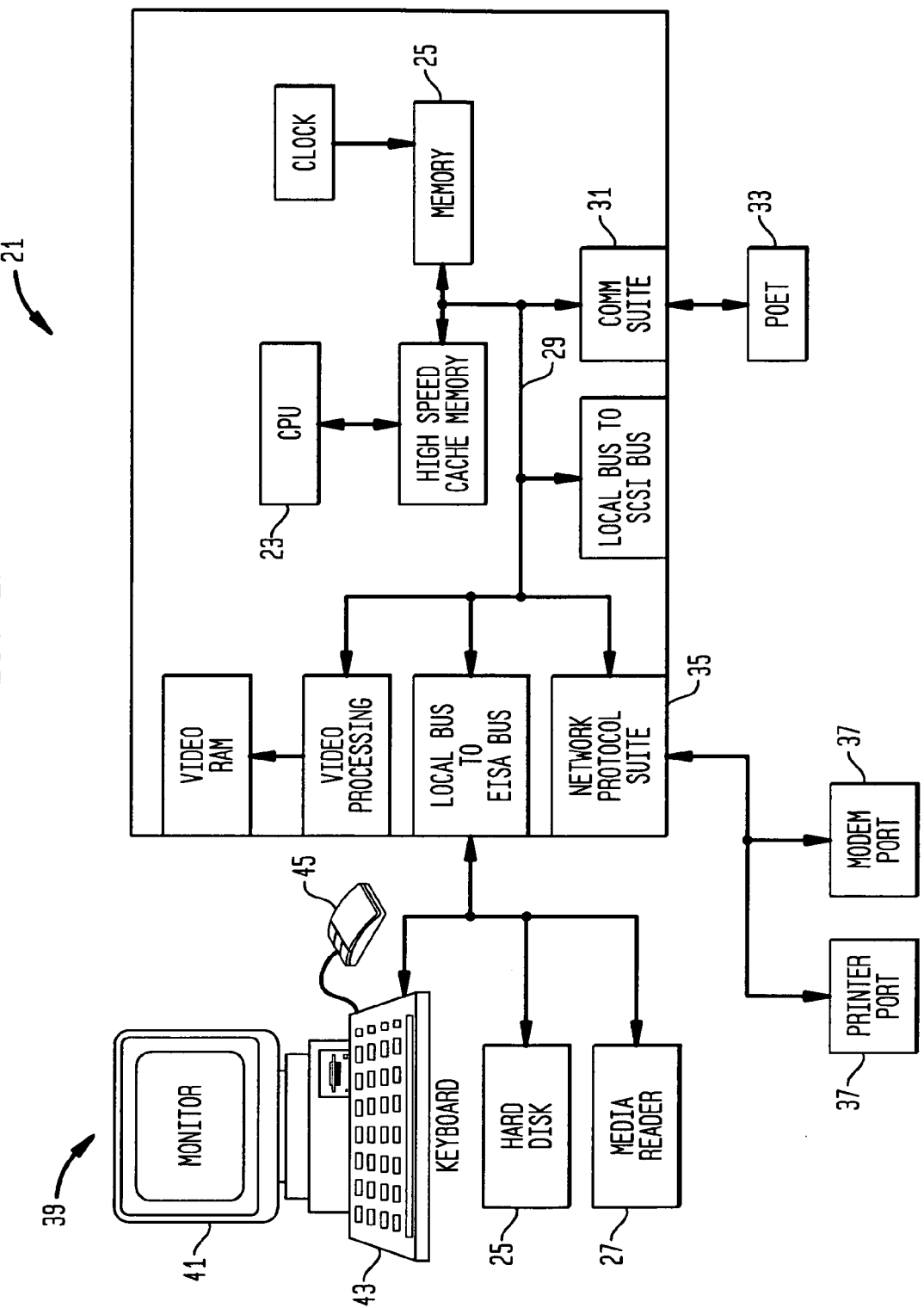
FIG. 17 is a schematic diagram of an exemplary computer system on which a system according to the invention may be deployed.

An embodiment of a computer 21 executing the instructions of an embodiment of the invention is shown in FIG. 17. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard)232, 422, 423, USB (Universal Serial Bus) and others.

The network protocol suite 35 and external ports 37 allow for the physical network connection and collection of protocols when communicating over a network. Protocols such as TCP/IP (Transmission Control Protocol/Internet Protocol) suite, IPX/SPX (Internetwork Packet eXchange/Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touch screen 43 and pointing device 45 such as a mouse, trackball, optical pen or others to provide an easy-to-use, user interface for the invention.

The computer 21 can be a handheld device such as an Internet appliance, PDA (Personal Digital Assistant), Blackberry device or conventional personal computer such as a PC, Macintosh, or UNIX based workstation running their appropriate OS (Operating System) capable of communicating with a computer over wire line (guided) or wireless (unguided) communications media. The CPU 23 executes compatible instructions or software stored in the memory 25. Those skilled in the art will appreciate that the invention may also be practiced on platforms and operating systems other than those mentioned.

Configurable Search Engine

The presently-described search engine uses state of art techniques for XML indexing, XML data storing, full-text searching, and structure data query processing for retrieval from XML document collection(s) based on configurable templates. Path expressions are used to process and index XML data. The query processing in the search engine combines information retrieval with regular path expression to query XML data. Since XML data might or might not follow a DTD or a schema, the search engine is applicable to any well-formed XML documents.

The system of the present invention retrieves structured data from XML document collection(s) based on configurable templates. It is easily deployable in a distributed, heterogeneous environment such as a Web application and is easily adaptable to different settings. It is possible to plug the system into other Web applications.

Figure 1:
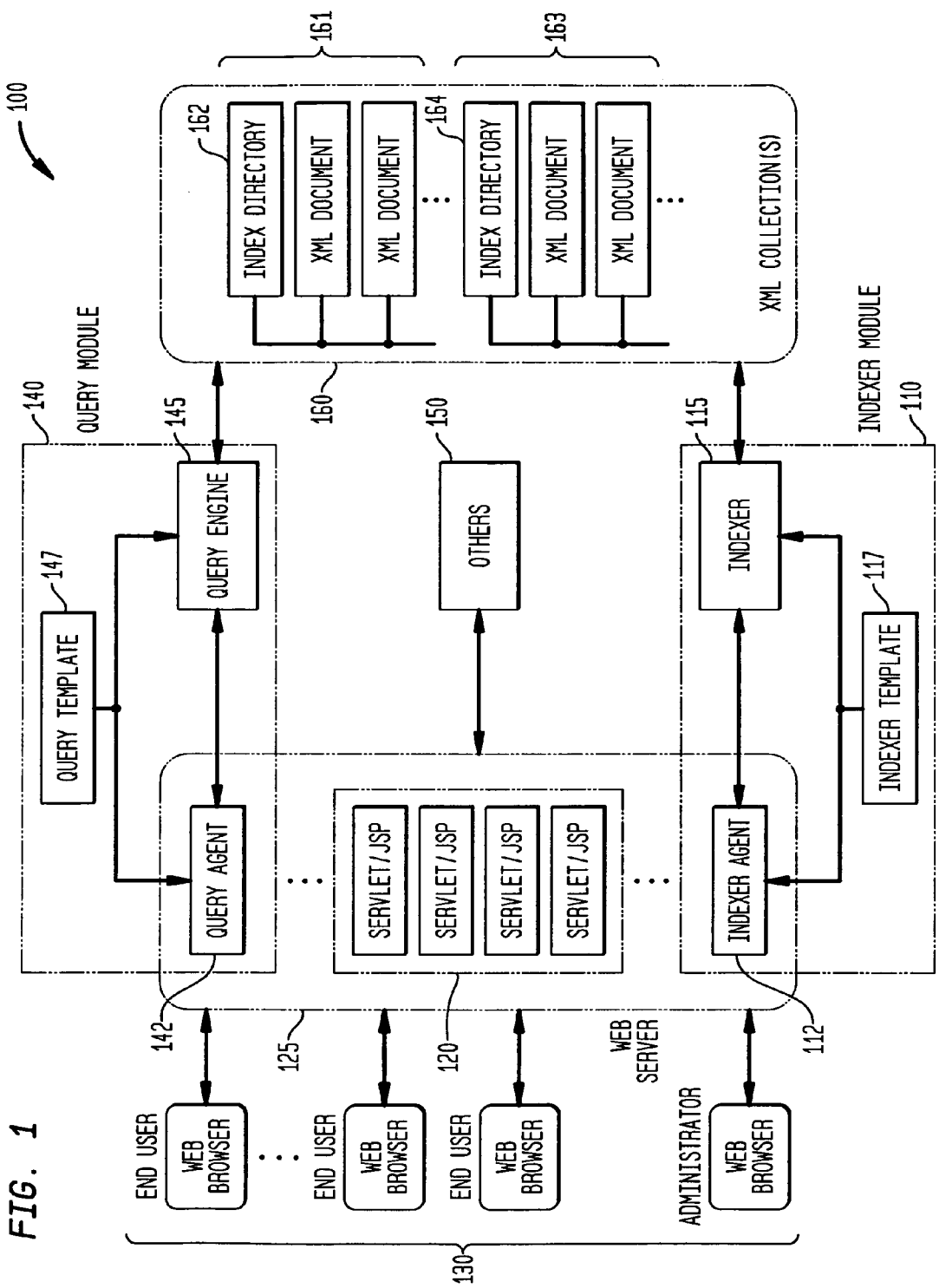
FIG. 1 is a schematic diagram showing an overall architecture of a system according to one embodiment of the invention.

An overall architecture of a search engine system 100 according to the present invention will now be described with reference to FIG. 1. The system 100 is a modular component-based architecture. The components of the search engine system 100 are grouped into two major modules: an indexer module 110 and query module 140. The indexer module 110 has an indexer agent 112 and indexer components 115. The query module 140 has a query agent 142 and query engine 145. The indexer components 115 and query engine 145 access the collection 160 of indexed XML documents.

The indexer agent 110 and query agent 140 are a set of Java server pages (JSPs) or servlets in a Web server 125. The search engine 100 can be easily configured and deployed in different Web environments such as environment 130 and adapted to different settings. The search engine can either work in a stand-alone mode or can be integrated with other Web applications such as application 150.

The indexer agent component 112 gathers information from XML collections such as collection 160. XML collection context is defined here so users can select the desired XML collection(s). The graphical user interface (GUI) design such as color scheme can also specified with the indexer template. As noted, the indexer agent 112 is composed of a set of JSP or servlet files 120.

Indexer components 115 perform document analysis, extract data (structure or non-structure) from XML documents, indexes the extracted data and transmits the collected information to the index files 162, 164 in the server.

Both the indexer agent 112 and the indexer 115 are configurable based on an indexer template file 117.

The indexer template file 117 defines the indexer agent 112 context levels so a user can select XML collection(s). Users can select one XML collection 161 and let the indexer generate one index directory 162. Users can also select multiple XML collections such as collections 161, 163 and let the Indexer generate multiple index directories at once. All the activities can be done within a Web browser.

Figure 2:
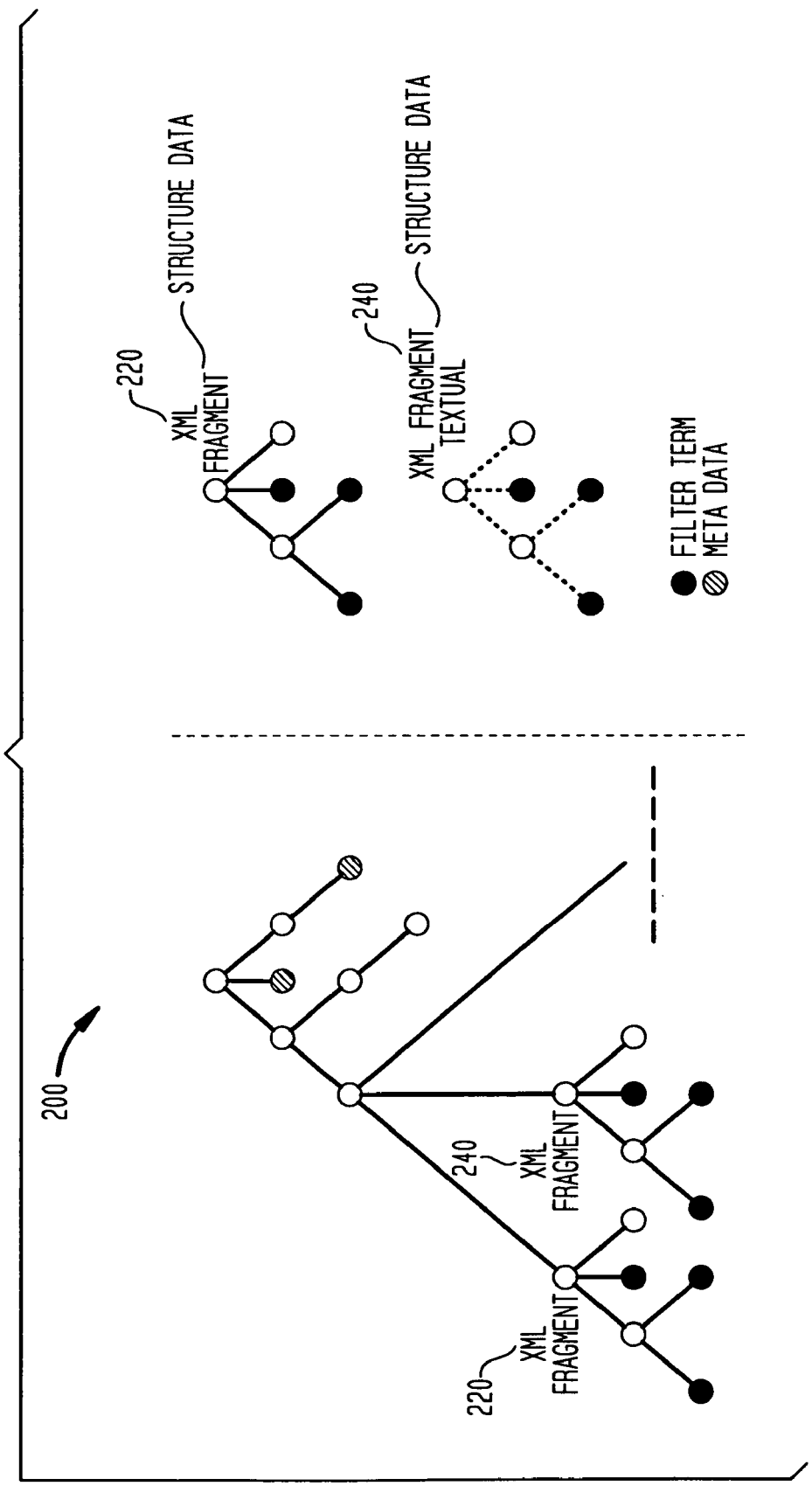
FIG. 2 is a schematic diagram showing XML fragments of data to be indexed using a system according to one embodiment of the invention.

The indexer template file 117 also defines the filter items and XML data fragment node paths. Exemplary fragment node paths 220, 240 in an XML document 200 are shown in FIG. 2. The paths 220, 240 are used by the indexer to locate and extract data from XML documents. The fragment node paths include structure data fragments such as terminal node fragment 220 and textual fragments such as sub tree fragment 240. The terminal node fragment 220 and sub tree fragment 240 are stored differently.

Figure 3:
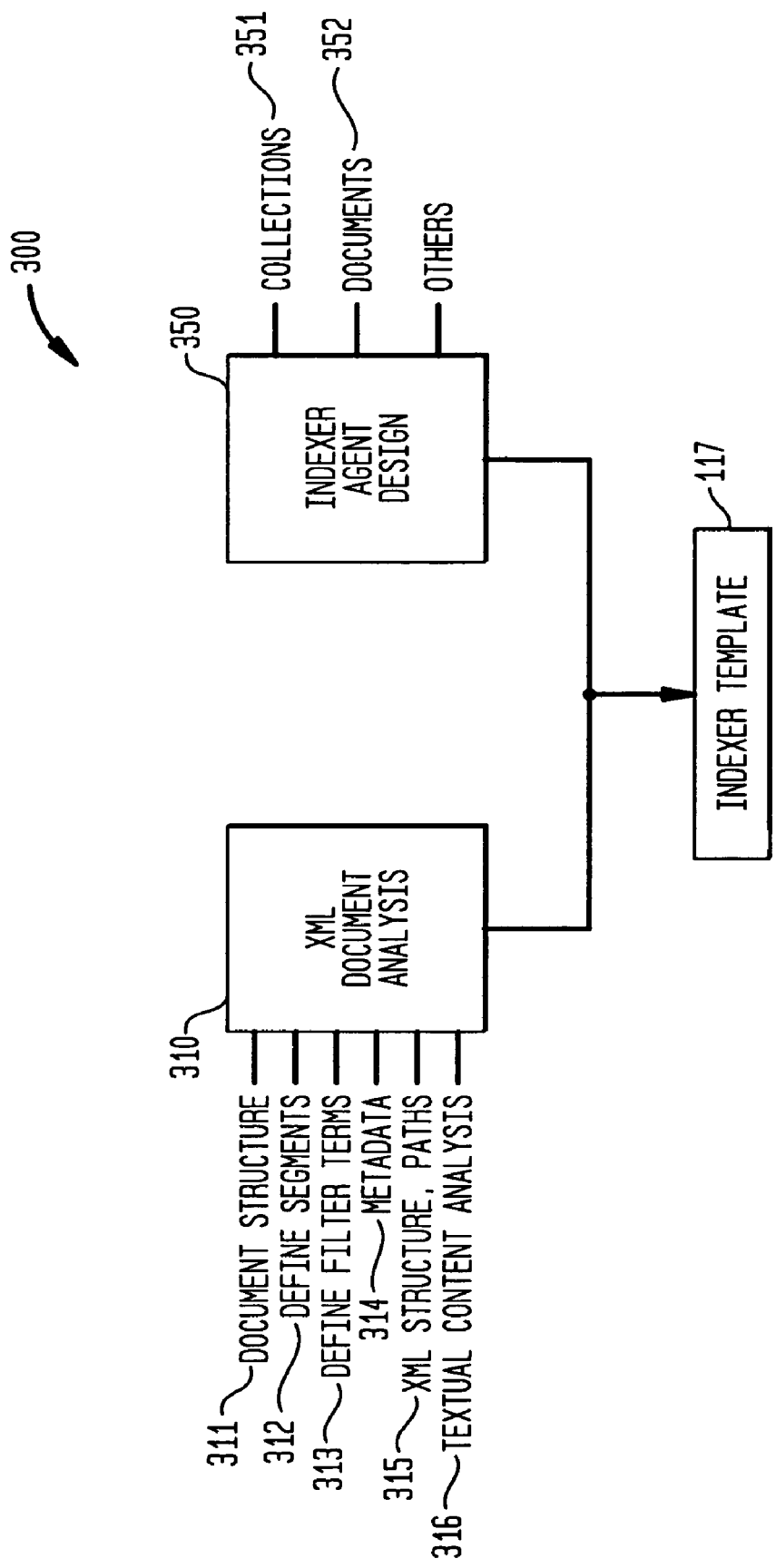
FIG. 3 is a schematic diagram showing an indexing template according to one embodiment of the invention.

As illustrated in FIG. 3, the indexer template design 300 includes an XML document analysis portion 310 and an indexer agent design portion 350, both of which are used in designing the indexer template 117. Indexer agent design considers collections 351 and documents 352, as well as others.

Document analysis is a first step for both indexer template design and indexer design and implementation. It is necessary for structural query in the query processes discussed below. The XML document analysis 310 includes document structure 311, define segments 312, filter terms 313, metadata 314, XML structure and paths 315 and textual content analysis 316. Those elements are described separately below.

Document analysis: initially, the structure and textual content of documents in collection are analyzed to determine the document structure tree, XML fragments, filter terms, their relations to the content, etc. Since the index of a collection will affect the query process later, the document analysis should take care of the needs of the query process. The inventive search engine builds upon several basic data structures.

Metadata: the metadata encompasses information on documents; for example, document type, collection affiliation and term statistics, and information on collections like document schema (DTD, XML schema), main language, and other document statistics.

Fragment value: includes XML fragment data as shown in FIG. 2 and described above. The fragment data may contain child elements and attribute values, as well as typed values. It comprises the structured parts of a document. Structural queries can be applied here.

Fragment text: the text content of an XML fragment that may contain words, sentences and phrases of a natural language. It can be used for regular text-based querying. The data for the full text comprises terms, their occurrences and the term positions. The terms are processed from the document words by stop word elimination, stemming and possible usage of thesauri/ontology. The term position is determined by sentence and word recognition. The structure index includes information on elements, element/sub-element relationships, attributes, and paths. XML-elements are also associated with a position number. Values, like author names or publication years, in the value index are extracted from XML attributes or elements. They are associated with a data type as defined in the relevant XML schema.

Filter terms: selected content or attribute values of an atomic element are stored in this field. They are used to narrow down the search range and speed up the search.

Stop context: an XML fragment to be excluded from processing. The fragment can be described by a path expression. Stop word lists or stop context can be defined on a per collection basis.

XML structure/path: information used for querying the document structure or evaluating path expressions.

An exemplary indexer template 400 is illustrated in FIG. 4. The indexer parses an input document and creates indexes for a set of fields. For example, in the index template 400, indexes are created for the fields identstr (line 490) and Rek (line 490). Those indexes are later used for searching.

Figure 5:
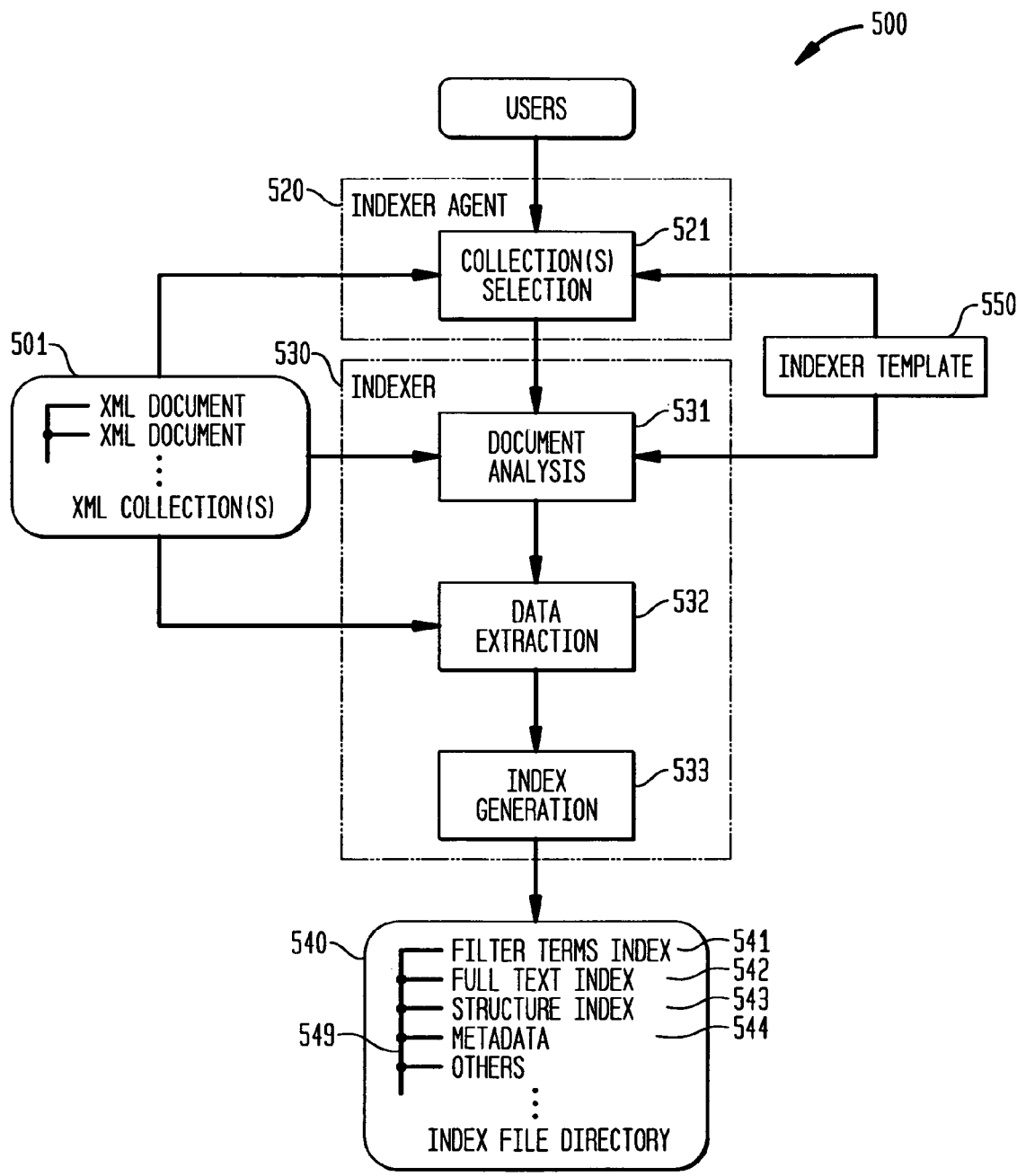
FIG. 5 is a flow chart showing an indexing process according to one embodiment of the invention.

An indexing process 500 according to one embodiment of the invention will now be described with reference to FIG. 5, wherein an XML document collection 501 is indexed. After a user 510 selects the XML document collection(s) (one or multiple) (step 521) using the indexer agent 520, the indexer 530 starts the document analysis (step 531), extracts data (structure or nor structure data) (step 532), and then indexes (step 533) and saves the extracted data to the index directory 540.

Users select the desired XML collection(s) using a GUI of the indexer agent 520 and submit the selected collection(s) to indexer 530. Initially, the indexer 530 extracts some metadata on the collection 501 before processing individual XML documents, and then extracts the metadata of a document with a document parser inside the indexer. That data includes information such as the document name, title, author, timestamps, document type, and others.

In step 531, the document structure is analyzed to determine the document structure tree, XML fragments, filter terms, and their relations to the content.

The XML fragments are then extracted in step 532. A XML fragment is structure data and a segment of an XML document. It can be queried with a regular path expression. The definition and path of the XML fragments are specified in the index template file 550.

The textual content of the XML fragments and the specified filter terms are also extracted. The filter terms are specified by the index template 550 and are the content or attribute of atomic elements within an XML fragment. The textual contents of metadata, XML fragments, and filter terms are analyzed based on linguists, thesauri or ontology. There are some dependencies between analysis steps because some results of one analysis may be helpful or even necessary for another analysis.

Term position must be determined before stop word elimination because some terms are not counted and some phrase searches may fail. Stop word elimination should be processed before stemming because stemming is expensive depending on the number of words. Stop words such as "the," "a," "if," etc. that increase the overhead but add no value during searches are removed here.

The metadata 544, a XML fragment structure index 543, the textual contents 542 of the XML fragment and filter terms 541 within the XML fragment are fields of a record 549 and are added to the index and stored. Records are used during searching and represent the 'hits' of a search. The index of a collection is stored in a set of files 540 that indexer 530 creates in a directory specified with indexer template 550 in the search engine server. Each document collection 501 has a separate directory 540 for each index. The indices may also be stored in-memory or mapped to a RMDS database specified by the indexer template 550.

The query processing according to the invention, using the query module 140 (FIG. 1), will now be described. The query agent 142 presents a GUI to the user in which the user can specify the query range: multiple XML collections, a single XML collection, multiple XML documents in a collection, or a single XML document in a collection. That collection or document context is specified in the query template 147. A user can query information from a keyword field that covers textual contents of XML fragments and can be narrowed down with filter items. The XML fragments are defined within the indexer template 117 and are used within the search engine. The filter items are also defined in the index template 117 and used in the query module 140.

The structure information, which is the position of filter items in an XML fragment, is queried with a regular path expression. The paths are used to locate and highlight data in an XML fragment. The filter items specified in the template files include content of elements or attribute values of elements within an XML fragment.

The query engine 145 queries data from the index (e.g., index 162) of the collections 160 selected by the user. If one collection is selected, the search can be narrowed down to one document or multiple documents in the collection selected by the user. The query engine 145 performs query parse, query evaluation, pattern matching, XML fragment modification, and presents the query results.

The query agent 142 comprises a set of JSP files or servlets 120. The query engine 145 comprises a set of Java classes. The query module 140 is configurable based on the query template 147 where both query agent 142 and query engine 145 read configuration information. One example 600 of an XML query template in accordance with the invention is shown in FIG. 6.

Figure 7:
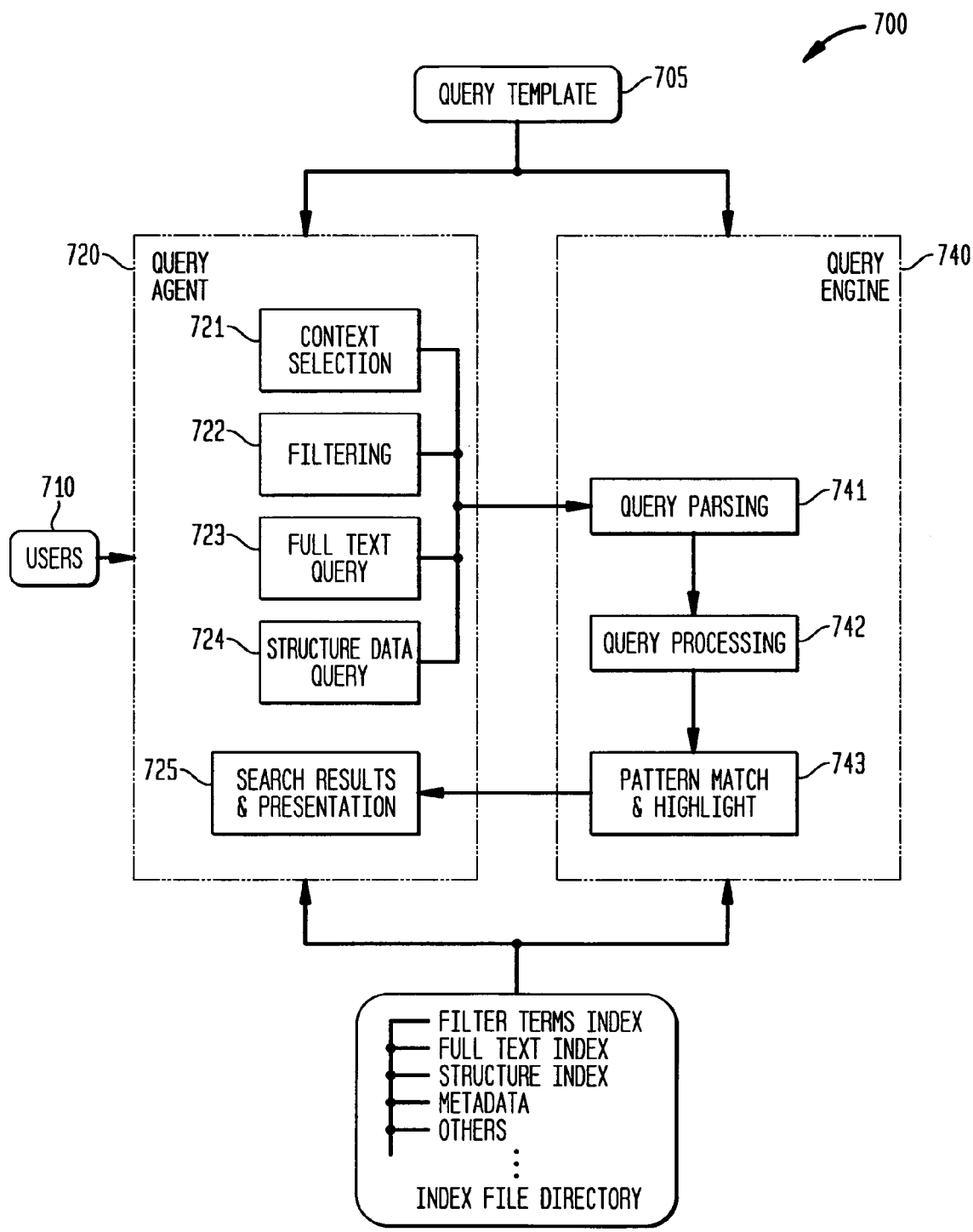
FIG. 7 is a schematic diagram showing a query process according to one embodiment of the invention.

A process 700 for conducting a query in accordance with the invention is shown schematically in the diagram of FIG. 7. As described above, using the query agent 720, a user 710 can select the query context 721. If a single collection is selected, users can either specify an individual, multiple, or all the document(s) in the collection. A user can perform a full text query 723 of whole textual content of XML fragments or the filter items 722. The structure data query 724 is specified in the query template 705.

When a user clicks a search button, the query engine 740 begins parsing (step 741) the queries gathered from users and from the query template 705. Query processing (step 742) combines both information retrieval (text search) and XML data structure retrieval (path search).

The search engine system of the invention allows a user to submit simple text queries for XML collections. The user can formulate his query as a Boolean query and use concepts like words, phrases, and sentences. To query the structure of the XML documents, path expression can be used in conjunction with the text query operations.

FIG. 8 shows the syntax of a full text query expression according to the invention. The syntax includes simple keyword searches, combining keywords within Boolean expressions, or querying for phrases, sentences, etc. The syntax is also applied to the queries of filter items.

Full text search queries can be carried out on the data stream, regardless of the XML document structure. Queries can be performed on the metadata, on the textual content of XML fragments, or on the element values or attribute values of filter items. Here, the XML fragments and filter items are, in turn, search terms in the XML data structure retrieval and can be described by path expressions. For example, they can be described as pattern matching 743 on element or attribute names. Below we will describe the retrieval processes and illustrate how combined queries can be expressed.

The XML Path Language is used to query structure data. The XPath 1.0 language is fully supported in the search engine system of the invention. The path expressions are embedded in the query template. As shown in the sample query template 600 of FIG. 6, the path expressions 610 are used to specify the filter items in the matching XML fragments. Path expressions 620 are also used to specify the return document fragments since often only a certain fragment of the XML document should be referenced in the query result, rather than the whole document. By default, references to the root nodes of the matching documents or matching fragments are returned depending on which results are presented.

The query results can be presented (step 725) in at least two ways. First, all resulting XML fragments are organized together and sent back to the query agent 720, where they are presented to the users. The results can be displayed either in an HTML or PDF format depending upon the preferred style.

Second, all resulting XML document names are organized and listed on the user screens. A user can select and look a document in which he is interested. The matched contents are highlighted in the document. The view of the document can also be displayed either in an HTML or PDF format depending upon the preferred style. The final format of search results and the presentation manner are specified in the query template

EXAMPLE EMBODIMENT

One interesting e-business activity is the managing and selling spare parts over the Web, especially for complicated systems such as gas turbines. In the following exemplary embodiment, it is demonstrates how to retrieve gas turbine parts information for supporting e-business particularly for gas turbine spare parts with the search engine of the present invention.

Figure 9:
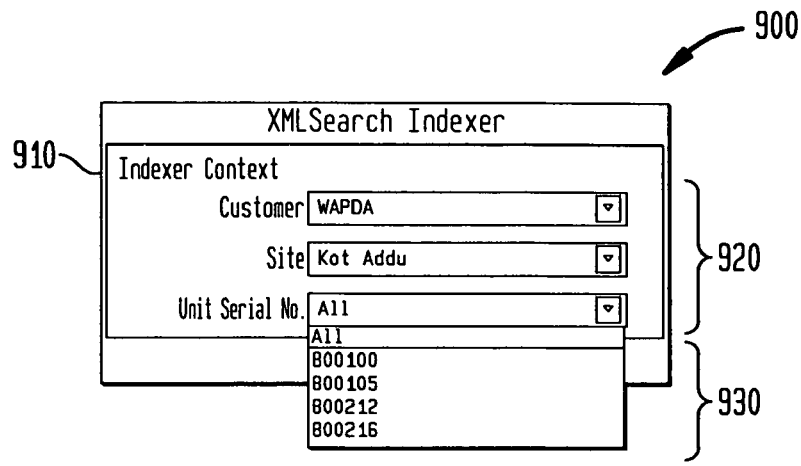
FIG. 9 is an example screen shot showing an indexer GUI according to one embodiment of the invention.

FIG. 9 shows the indexer agent GUI 900 of the user case. From the index context section in the GUI, a user can select the XML collection(s) 920 for which an index or indices will be generated. In the gas turbine parts example, where a turbine provider has many customers, each customer may have one or more power station sites and each site may have one or more turbines. Each turbine may have a collection of spare parts catalogs, and the catalogs are XML documents. In the current example, four index directories 930 will be generated, where one index directory will be generated for one collection of XML documents of one turbine unit.

Figure 10:
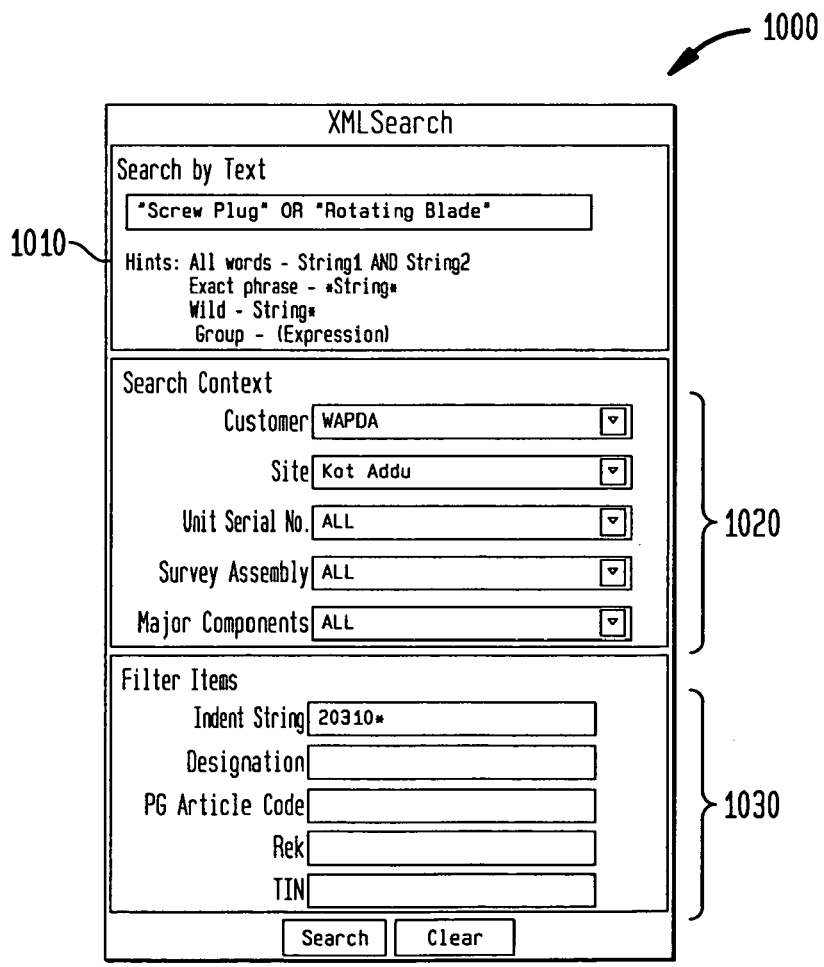
FIG. 10 is an example screen shot showing a query agent GUI according to one embodiment of the invention.

A query agent GUI 1000, shown in FIG. 10, comprises a text search section 1010, a search context section 1020 and a filter items section 1030 where context filters can be defined. The XML structure queries (path queries) 610 (FIG. 6) are embedded in the query template file 600.

Figure 11:
FIG. 11 is an example screen shot showing search results from a query according to one embodiment of the invention.

FIG. 11 shows a search result table 1110. The XML document format for the table 1110 is specified in the query template. In the example, all matched XML fragments in the specified documents are grouped together and presented in the table 1110.

FIG. 12 shows the results by a list 1210 of matched XML documents where the query is the same as in FIG. 10. A user can select a document where the matched contents are highlighted.

Both index agent 520 (FIG. 5) and query agent 720 (FIG. 7) are a set of JSP or servlets and can be deployed in any Web application. The indexer agent 520 works as a bridge between indexer client with web user interface 510 and the indexer 530 (FIG. 5). The query agent 720 works as bridge between searcher front with web user interface 710 and the query 740. The user interfaces can be customized based on their template files. The <indexer> element 410 illustrated in FIG. 4 contains the indexer agent configuration. The <search> element 605 illustrated in FIG. 6 contains the query agent configuration. Both agents are modulated and running in an Apache/Tomcat web server.

The described search engine is suited for traditional keywords search as well as context sensitive search for a large collection(s) of XML documents. The context level is configurable. The engine provides a unique mechanism with configurable approaches to extract, index, and store XML data whose depth of the hierarchy can be irregular and unpredictable. A file system that is available in each computer is used as the storage for index.

Because search filter items are defined in query template, they are configurable and can be optimized for different applications. The search engine is optimized for both full text searching and structural XML data searching. The engine is very fast and effective. Since XML data might or might not follow a DTD or a schema, the search engine is applicable to any well-formed XML documents. The search engine can run as a stand-alone application and can also be easily deployed in a distributed, heterogeneous environment such as a Web application and adopted to different settings.

Weighted Navigational Index

The indexer module 110 (FIG. 1) must handle the semi-structured data often found in XML documents, which includes both content and structure information. Indexing semi-structured data is at the frontier between Information Retrieval (IR) and database (DB) research. A variety of techniques have been developed over the years for finding information in text documents efficiently. Since the advent of the relational data model in the early seventies, numerous index structures for information stored in tables have been proposed and refined. On the other hand, the semi-structured data model creates additional problems and demands, adding structure to what used to be flat documents or relations. It is true that object-oriented database systems have addressed those issues before, as they tried to store structured data in a more flexible and expressive manner than the relational or hierarchical databases of the early days. In the meantime, however, practical experience has shown that data to be exchanged by different parties (primarily over the Web) often cannot be shoehorned into a predefined schema, as required by all traditional database management systems.

Indices for semi-structured data face a challenge previously ignored by other models; specifically, indices for semi-structured data must handle data with seemingly irregular structure whose underlying schema, although contained in their description, is usually not given explicitly. Even if present, such a schema can pose a challenge due to the innumerable possibilities that it can contain.

Queries to such a collection of documents can either be in the form of typical XML query languages such as XPath and XQuery, or in the form of a simple keyword query. Alternatively, some other form of content-based query may be used that takes into account the hierarchical structure that is inherent in those documents.

Figure 13:
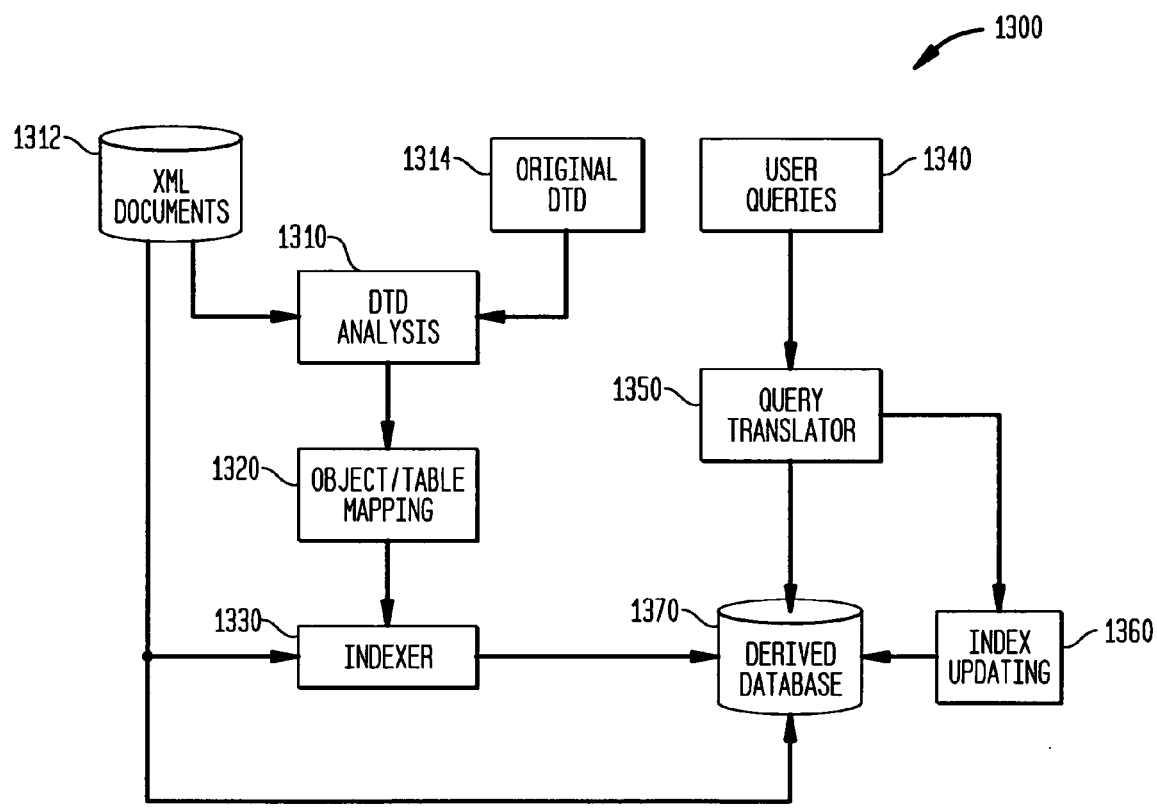
FIG. 13 is a schematic diagram showing an overall architecture of an indexer system according to one embodiment of the invention.

The weighted navigational index of the invention addresses the problem of retrieval of document elements or whole documents from a collection of XML documents via an efficient indexing scheme. A schematic diagram 1300 showing the main steps in the process is shown in FIG. 13. An initial step is to analyze (step 1310) the DTD 1314 or the schema that defines the document collection 1312. During that step, the most important elements are identified, including attributes, subgroups and the like. Parent-child relationships, sibling relationships, groupings, and nested hierarchies are observed and identified. Sometimes the DTDs are very generic, but the full scope of them is not necessary to characterize the class of documents under consideration. So, in order to be able to optimize the database in terms of the number of tables and columns, the first task is to note not only the DTD, but also representative documents to identify their scope.

The DTD is then mapped (step 1320) into a relational database. To do that, the DTD is first mapped to a sequence of classes, which are then mapped to a table schema suitable for a relational database. It is also important to identify the foreign and primary keys of the different tables. That effectively defines the database schema. It is important that all available and likely documents are appropriately mapped. Further, the relationships between the different tables must be mapped sufficiently accurately for any XML query to be translated to a corresponding database query.

Indices are next created (step 1330) for the paths and the content that is used for querying. In the presently described invention, and described in more detail below, a novel weighted navigational indexer creates an index on both the path as well as the keywords in any of the nodes.

It is important to maintain and update the stored information from a document collection to be used by the system. To do that, the indices are used in a systematic way and are updated (step 1360) after the query results have been presented to the user 1340. The updated indices, together with information from the query translator 1350, are stored in a derived database 1370. The idea behind this is that there are certain keywords or even path queries that are more important than the others that can be portrayed via a-priori probability distribution. However, as more observations accumulate over time, that must be updated and the index recomputed to make sure that the system continues to adapt itself.

Figure 14:
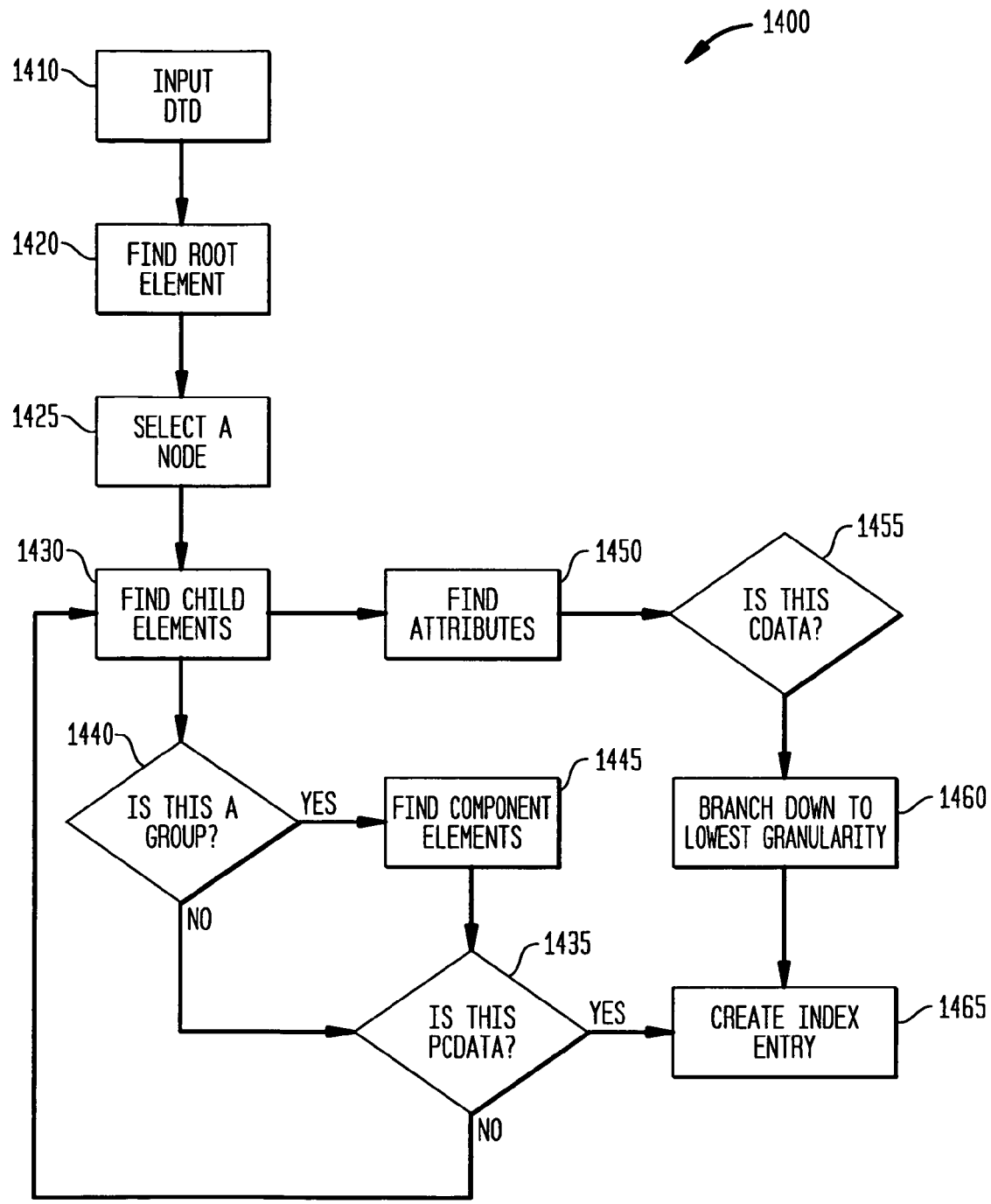
FIG. 14 is a flow chart showing a DTD analysis method according to one embodiment of the invention.

The initial step of the process, discussed above with reference to element 1310 of FIG. 13, will now be discussed in more detail with reference to FIG. 14. The overall step 1400 is for analyzing the underlying DTD. The primary purpose of that step is to map the DTD 1410 to a schema that can be used by a relational database.

For those segments that are identified to be segments that should be mapped to a conventional database, we identify the main elements and attributes and also to simplify the nested elements to linearize the structure. The root is initially identified (step 1420). Then, for selected nodes (step 1425) of the root element, children and attributes of the root element are identified (step 1430).

Each child element is examined (decision 1435) to determine whether it is of type PCDATA. If the child element is not of type PCDATA, then all children of those elements are found (step 1430). If a child is a group (decision 1440), then the components of the group are identified (step 1445).

The attributes of each element are also identified (step 1450). If the attributes are not of type CDATA (decision 1455), the process continues to branch down to the lowest granularity (step 1460).

The process checks to see if a sub-tree exists at different locations in the DTD. For every viable node, an entry is created (step 1465) in the path index table. That creates the path index table.

The steps of the process 1400 simplify the DTD 1410 and identify the elements and attributes that are actually used and that require mapping to the database schema. It must be remembered, however, that there are other segments of the DTD that are not mapped to the database, but are nevertheless linked. To a user, the system therefore appears to be an integrated system.

By checking whether a sub-tree exists at different locations in the DTD, and for every viable node, creating an entry (step 1465), it is determined which sub-trees are mapped to a relational database. If a similar sub-tree exists at different locations in the DTD, and if those sub-trees have an internal tabular structure, they can be mapped to a single table with a primary key that identifies the XML parent. Those sub-trees can alternatively be mapped to different tables.

The search mechanism of the invention depends on a properly created index. The index is both for the paths and the for contents. The index should additionally be adaptive to the usage. To make that possible, probabilities are assigned to the paths as well as the keywords.

Figure 15:
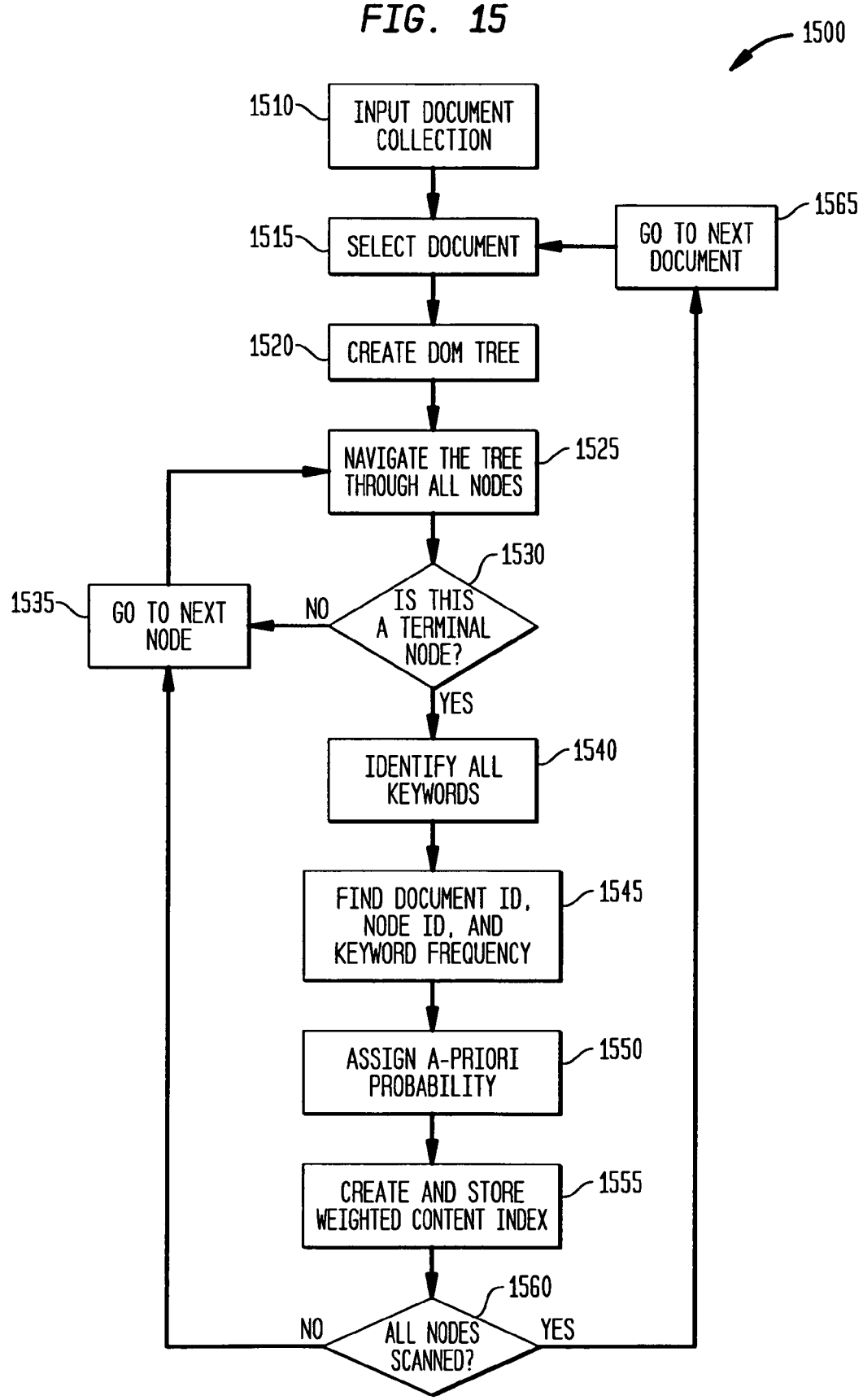
FIG. 15 is a flow chart showing an index generation method according to one embodiment of the invention.

A method 1500 for generating an index for a document collection in accordance with the invention will now be described with reference to FIG. 15. A document is initially selected (step 1515) out of the document collection 1510, which is to be analyzed and stored in the database. Each document has a document ID. A Document Object Model (DOM) tree is next created (step 1520) for the selected XML document. Each node in the tree is assigned a number.

The method next navigates through each node in the DOM tree (step 1525) to create the index. Each node actually describes a path. If the current node is not a terminal node (decision 1530), the method goes back to the next node (step 1535), which could be a sibling if one exists, or it could go back to the sibling of the parent if it is a terminal node.

Once a terminal node has been identified, the keywords for the content are identified (step 1540). For each keyword, the frequency in that node is computed (step 1545). An a-priori probability is assigned (step 1550) that reflects the likelihood of a query with that keyword in that path.

A weighted content index is next created (step 1555). In one exemplary system, a keyword index is given by a formulation such as:

F(DocID, NodeID, LevelID, ElementType, Keywd-Freq, Probability)

For example, if the keyword "image" in a certain paragraph that is a terminal node has an index entry (&25,&120, 3,#5,4,0.12), that would mean that the keyword "image" is present in the $802^{nd}$ node of the $25^{th}$ document at level 3 at the element type #5 and it appears 4 times in that paragraph and the likelihood of it being queried is 0.12.

The system then checks whether all the nodes in the current page have been accounted for (step 1560). If not, the system proceeds to the next node (step 1535) and so on. If all the nodes have been considered for the current document, the system moves on to the next document in the collection (step 1565).

A final step in the indexing process is querying and index updating. In that process, the indexed database is queried. Queries must be properly processed to make full utilization of the above method.

Figure 16:
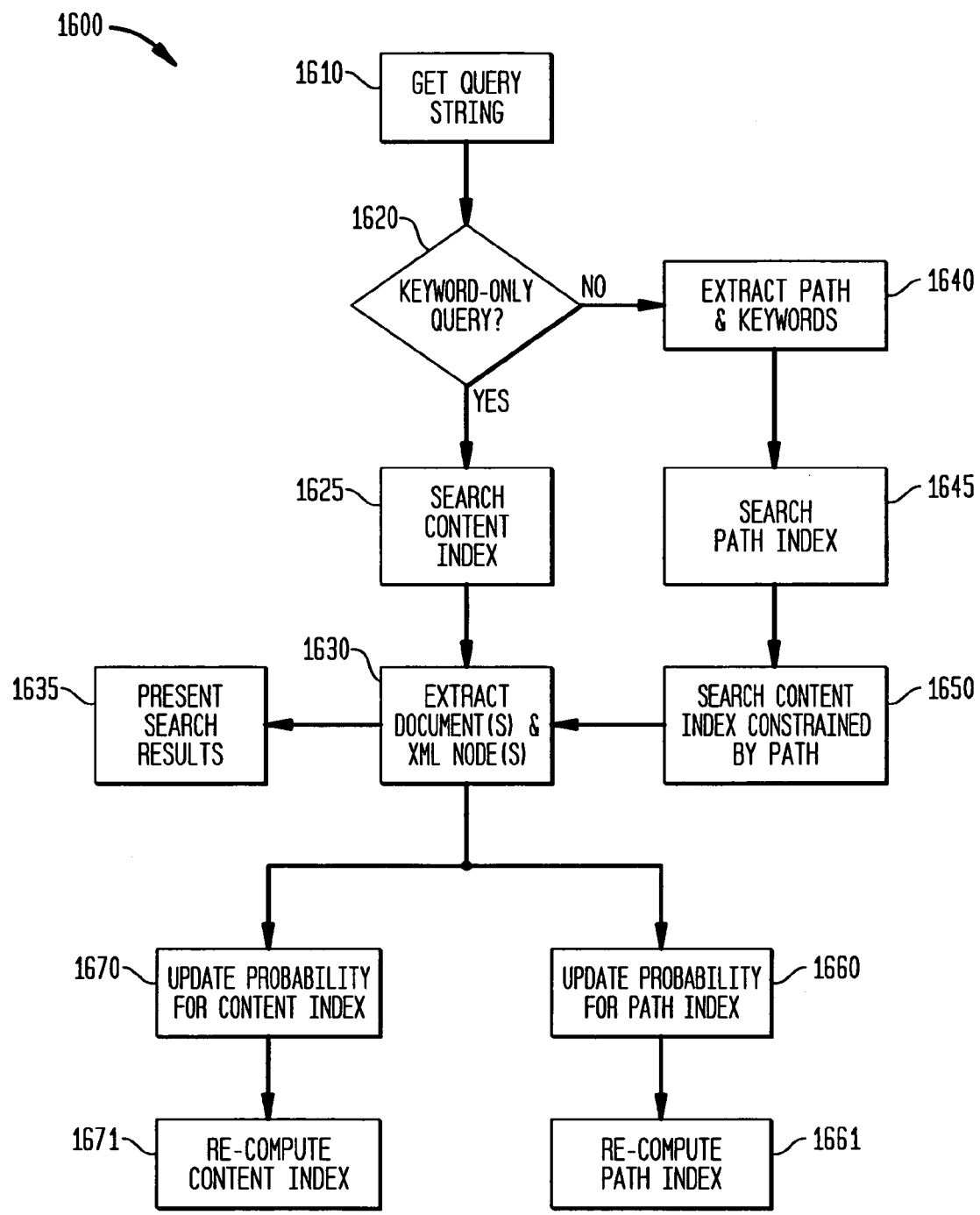
FIG. 16 is a flow chart showing an index querying and updating method according to one embodiment of the invention.

The querying and index updating process 1600 will be described with reference to FIG. 16. Initially, a query string is retrieved (step 1610) and parsed (step 1610) to judge whether it is a regular keyword-only query or if it is an XML query that provides some path information (decision 1620).

If the query string is a keyword-only query, determine the entries in the index table (step 1625) for that query, in the form described with reference to FIG. 15. The documents and the XML fragments are next extracted (step 1630) and the search results are presented (step 1635).

If the search does provide some path information (decision 1620), the path and keyword information must first be extracted (step 1540). For example, the search results may provide a full path such as Anydoc/groupparts/partslist/para ["bolt"] or may provide only a truncated path such as //partslist/para["bolt"]. In either case, the paths table may be consulted to determine the nodes to look for.

Once the probable paths have been determined (step 1645), we can then do a constrained search for the content index (step 1650). In addition to presenting the results to the user, the probabilities for the content (steps 1670, 1671) and the path index (steps 1660, 1661) are to be updated as well.

The above technique for generating and using a weighted navigational index provides a way to optimally archive and query XML documents. The index is created using an innovative way to analyze a DTD along with the document collection. A path index is created from the DTD analysis, while a weighted navigational content index is created from the results of the analysis of the DTD and the document collection.

A probability measure is used to position the entries in the document and path indexed. Those probabilities are updated along with the usage results and the queries that are used against the system.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with the indexing and searching of data stored as XML documents, those skilled in the art will understand that the technique may be used as well in connection with data stored using other mark-up languages and other extensible languages. It is to be understood that the embodiments shown and described herein are only illustrative of the principles of the present invention and that various modifications may be implemented by those skilled in the art without departing from the scope and spirit of the invention.

What is claimed is:

1. A method for accessing a collection of mark-up language documents having a document type definition (DTD) defining the documents of the collection, the method comprising the steps of:
   mapping nodes of the DTD to create a path index table entry in a path index;
   for each document in the collection, performing the steps of:
      creating a document object model (DOM) tree for the document, the DOM tree including terminal nodes;
      identifying keywords in the terminal nodes; and
      for each keyword in each terminal node, creating a weighted content index entry in a weighted content index, the entry including an a-priori probability of a query with that keyword for that terminal node;
   performing a query of the collection of documents using the path index and the weighted content index to obtain query results; and
   updating the path index and the weighted content index based on the query results.

2. The method of claim 1, further comprising the step of:
   computing the a-priori probability of a query with that keyword for that terminal node by calculating a frequency for the terminal node and keyword.

3. The method of claim 1, wherein the weighted content index entry is in the form:
   F(DocID, NodeID, LevelID, ElementType, KeywdFreq, Probability),
   wherein DocID is a document identification, NodeID is a node identification, LevelID is a hierarchy level, ElementType is an element type, KeywdFreq is a frequency of the keyword in the terminal node and Probability is said a-priori probability of a query with that keyword for that terminal node.

4. The method of claim 1, wherein the step of performing a query of the collection of documents using the path index and the weighted content index to obtain query results further comprises the step of:
   referring to the path index to determine the paths to search; and
   conducting a constrained search of the determined paths using the weighted content index.

5. A computer program product comprising a computer readable recording medium having recorded thereon a computer program comprising code means for, when executed on a computer, instructing said computer to control steps in a method for accessing a collection of mark-up language documents having a document type definition (DTD) defining documents of the collection, the method comprising the steps of:
   mapping nodes of the DTD to create a path index table entry in a path index;
   for each document in the collection, performing the steps of:
      creating a document object model (DOM) tree for the document, the DOM tree including terminal nodes;
      identifying keywords in the terminal nodes; and
      for each keyword in each terminal node, creating a weighted content index entry in a weighted content index, the entry including an a-priori probability of a query with that keyword for that terminal node;
   performing a query of the collection of documents using the path index and the weighted content index to obtain query results; and
   updating the path index and the weighted content index based on the query results.

6. The computer program product of claim 5, further comprising the step of:
   computing the a-priori probability of a query with that keyword for that terminal node by calculating a frequency for the terminal node and keyword.

7. The computer program product of claim 5, wherein the weighted content index entry is in the form:
   F(DocID, NodeID, LevelID, ElementType, KeywdFreq, Probability),
   wherein DocID is a document identification, NodeID is a node identification, LevelID is a hierarchy level, Element Type is an element type, KeywdFreq is a frequency of the keyword in the terminal node and Probability is said a-priori probability of a query with that keyword for that terminal node.

8. The computer program product of claim 5, wherein the step of performing a query of the collection of documents using the path index and the weighted content index to obtain query results further comprises the step of:
   referring to the path index to determine the paths to search; and
   conducting a constrained search of the determined paths using the weighted content index.

* * * * *